Patented May 7, 1929.

1,712,333

UNITED STATES PATENT OFFICE.

RAY P. DINSMORE, OF AKRON, OHIO, ASSIGNOR TO THE GOODYEAR TIRE & RUBBER COMPANY, OF AKRON, OHIO, A CORPORATION OF OHIO.

METHOD OF COMPOUNDING CAOUTCHOUC.

No Drawing.     Application filed November 22, 1924.  Serial No. 751,684.

My invention relates to the compounding of caoutchouc and caoutchouc-like bodies, and it has, for its primary object, the provision of a method of compounding caoutchouc whereby a stock having a low ratio of caoutchouc to reinforcing agent or filler may readily be manipulated.

Another object of my invention is to reduce the time and power costs of incorporating a "softener" in a rubber mix.

In a copending application Serial No. 662,992, filed September 15, 1923, and assigned to The Goodyear Tire & Rubber Company, there is disclosed a method of loading a stock with a material, which is suspended in a liquid medium and which may be too fine to permit of its filtration. More particularly, the object of the invention, disclosed in the above designated application, is to provide a method of incorporating a suspended reinforcing agent by mixing the suspension with a solution or emulsion of rubber and precipitating or coagulating the mixture. Although the invention set forth in the copending application presents advantageous opportunities in the employment of reinforcing agents theretofore considered of little value, I have discovered that the relative percentage of such agents in stocks may be increased. For example, it has been found difficult to manipulate a product in which the reinforcing material (using barium sulfate as an example) exceeds 64% of the total weight, because, upon drying a stock in which the filler exceeds this limit, it has a tendency to become hard and brittle, and, instead of softening when it passes through a mill, it becomes translucent, hornlike and exceedingly hot.

I have now found that, by incorporating a softener, such for example as an oil, grease, pitch or soft wax in the mixture of caoutchouc and an inert filler or reinforcing agent either before or after the coagulation, while the mass is yet highly plastic or even pasty, I am able to increase the weight of the reinforcing agent from 64% to 75 or 80% of the total product without encountering the former limitations.

As an example of the application of my invention, barium sulfate, which has been precipitated from saturated aqueous solutions of its chloride and sodium sulphate, is mixed with enough latex to give a weight ratio of rubber to $BaSO_4$ of 20:80. After considerable stirring, the excess barium chloride coagulates the latex and incorporates the precipitated particles. The solution of sodium chloride, which results from the reaction, is then filtered or decanted and the sludge is washed free from water soluble matter. To this master-batch about 1% of pine oil is added and the product is then dried and incorporated with more rubber on the mill in the usual manner.

By practicing my invention, it is to be noted that I not only obviate the former difficulties involved in manipulating a highly loaded stock, but I use little or no mechanical power or time in incorporating the oil in the stock, whereas, in present day practice it requires a great deal of power and considerable time to mill oil into a dense mass of rubber. Moreover, I have provided for a method of preparing a master stock by means of which I am able to incorporate over twice as much filler in the same weight of emulsified or dissolved rubber.

In this disclosure I have used the words "filler" and "reinforcing agent" synonymously. I have employed the term "master-batch" to mean a mixture composed essentially of rubber and filler, in which the amount of filler is usually too large for the requirements of the final product and must be reduced by incorporating more rubber before vulcanization. The term "loaded stock" should be construed as meaning a rubber in which a filler has been incorporated.

Although I have described but a single procedure involving my invention, it is obvious that its adaption to similar processes with or without minor changes may be realized without departing from the spirit or scope of the invention and I desire, therefore, that only such limitations shall be imposed as are consistent with the prior art and the appended claims.

What I claim is:

1. A method of compounding caoutchouc which comprises adding a reacted mixture of solutions of soluble salt of barium and sulphate salt of an alkali to latex in such proportions as produce a mixture of rubber and barium sulfate, the proportion of the latter being in excess of 64 parts to 36 parts of rubber, precipitating the latex upon the sulfate particles, washing the mass free of water soluble material, drying it and incorporating it into additional rubber.

2. A method of compounding caoutchouc that comprises mixing an emulsified rubber with a suspension of an inert inorganic filler material, coagulating the mixture, washing the coagulum free of the water soluble materials and adding a softener while the material is highly pasty.

3. A method of compounding caoutchouc that comprises making a master batch by intermixing an emulsion of rubber with a suspension of filler material, coagulating the rubber on the filler material, washing the product free from water soluble material and adding a rubber softener while the mass is still highly pasty, and then incorporating this mass into a rubber mix upon the mill.

4. A method of compounding caoutchouc which comprises making a master batch by intermixing latex and a suspension of a precipitated inorganic filler material, coagulating the latex upon the filler, washing the resulting mass and incorporating a rubber softener while the mass is pasty, and subsequently milling the batch into a rubber mix.

In witness whereof, I have hereunto signed my name.

RAY P. DINSMORE.